Figure 1:
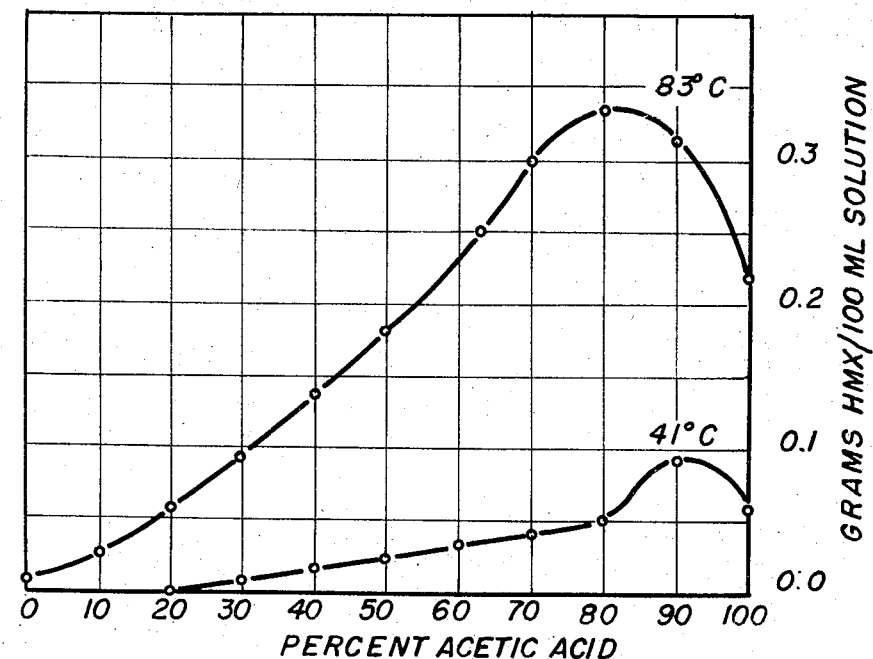

United States Patent [19]
Lee et al.

[11] 3,853,847
[45] Dec. 10, 1974

[54] PURIFICATION OF CYCLOTETRAMETHYLENE TETRANITRAMINE

[75] Inventors: Paul L. Lee; Sam B. Wright; Glenn E. Sims, all of Kingsport, Tenn.

[73] Assignee: The United States of America as represented by the Secretary of the Army, Washington, D.C.

[22] Filed: Oct. 2, 1961

[21] Appl. No.: 143,273

[52] U.S. Cl. .......................................... 260/239 HM
[51] Int. Cl. ...................... C07d 55/16, C07d 55/60
[58] Field of Search ..... 260/248, 701, 239, 239 HM

[56] References Cited
OTHER PUBLICATIONS

Urbanski, Chemistry and Technology of Explosives, Vol. III, Pergamon Press, New York, 1967, pp. 117 to 120.

Primary Examiner—Leland A. Sebastian
Attorney, Agent, or Firm—Eugene E. Stevens

EXEMPLARY CLAIM

1. A process for the purification of cyclotetramethylene tetranitramine which comprises heating a portion of crude cyclotetramethylene tetranitramine in the presence of linear nitramines in acetic acid, the acid concentration being at least 98 percent, to a temperature of from about 50 to 98°C., maintaining the resulting slurry for a period of about 15–45 minutes at said temperature from about 50 to 98°C., cooling the slurry to a temperature of about 30 to 40°C., adding to said slurry a new increment of said crude cyclotetramethylene tetranitramine, repeating the same cycle for a series of from 5 to 10 increment additions, and recovering a cyclotetramethylene tetranitramine product of high purity.

7 Claims, 2 Drawing Figures

SOLUBILITY OF HMX IN ACETIC ACID WATER MIXTURES

SOLUBILITY OF RDX IN ACETIC ACID WATER MIXTURE

Paul L. Lee
Sam B. Wright
Glen E. Sims
INVENTORS

PURIFICATION OF CYCLOTETRAMETHYLENE TETRANITRAMINE

This invention relates to preparation of a high explosive of high purity. More particularly it relates to a process for increasing the purity of cyclotetramethylene tetranitramine, commonly known as homocyclonite or HMX and referred to hereinafter as HMX.

HMX is commonly produced by the nitrolysis of hexamine (hexamethylenetetramine) with nitric acid in an acetic acid medium followed by aging, dilution of the anhydrous slurry to an acid concentration of 75% or less, heating to the appropriate temperature, and filtering. Suggested variations and improvements in this method are given in Bachman U.S. Pat. No. 2,798,870, an article entitled "Cyclic and Linear Nitramines Formed by Nitrolysis of Hexamine" by Bachmann and co-workers appearing in Vol. 73, pp. 2769–2773 of the June, 1951 issue of the *Journal of the American Chemical Society*, and in Silberman U.S. Pat. No. 2,941,994. In the earlier work the reported yields of HMX in the process are very low, the primary product being RDX, the chemical name for which is cyclotrimethylenetrinitramine. In the more recent method of Silberman in the aforementioned U.S. Pat. No. 2,941,994 HMX is reported to be obtainable in a purity of 80–86% and an overall yield of 90–96% of theoretical. It is therefore apparent that a process for producing high-purity HMX, that is, an HMX of 99% or greater purity is highly desirable. By the process of the present invention, we have reached such a result.

An object of the present invention is to provide a process for the preparation of HMX of a purity of at least 99%. Another object is to provide a process for the preparation of HMX whereby the decantation of the spent acid is improved. Still another object of this invention is to provide a process whereby the filterability of a crude HMX-acid slurry is simplified. A further object is to provide a method of producing high-purity HMX whereby the time required for filtration is reduced. A still further object of this invention is to provide a simplified procedure for purification of HMX produced by the nitrolysis of hexamine. Yet another object is to provide a procedure for increasing the crystal size of HMX produced from hexamine, thereby aiding the separation of a highly pure product.

In the broader aspects of our invention the crude HMX product is simmered in increments in an acid concentration of about 98%. The settling rate of the α-HMX may be increased in accordance with our invention by using a flocculant or precipitating agent which may be appropriately, for example, a high molecular weight water-soluble polymer of ethylene oxide, acrylamide or acrylonitrile or preferably a combination of such a polymer with an inorganic salt such as sodium chloride, aluminum potassium sulfate, barium chloride, ferric nitrate, magnesium sulfate and the like, such a combination acting synergistically in settling out the HMX crystals. In general, our novel process, which we will refer to hereinafter as "increment simmer", includes also a semi-continuous decantation procedure using a suitable flocculant. According to our process, rather than diluting the spent acid-HMX slurry to a concentration of 75% or less acid, the concentration is maintained at a higher level, preferably about 98%, adding acid, if necessary, rather than diluting with water, and the slurry is then simmered in increments or degrees. The slurry is first heated to 95–98°C., held at this temperature for about 30 minutes and then cooled to a temperature of from about 30–40°C. prior to adding a second nitration batch to the simmered slurry. The heat of reaction of acetic anhydride in the spent acid and water is allowed to heat the slurry and the temperature is raised to 98°C. and again held at this temperature for about 30 minutes. The batch as it then exists is then cooled, as was the earlier batch prior to the addition of the second nitration batch to a temperature of from about 30–40°C. This process is repeated for a total of 5–10 increment additions. In this process of heating and cooling, the small α-HMX crystals are grown considerably. The settling rate of the alpha crystals is improved, which allows for better decantation of the spent acid. The filtration time for the HMX-acid slurry is also improved, by nature of the larger crystals of α-HMX, thus decreasing the time required for the filtration and wash cycles.

In an alternative embodiment of the present invention, the simmered HMX reactor liquor is continuously decanted or overflowed effecting a concentration of the solids in the slurry. A flocculant may be used to increase the settling rate, as explained above. Regardless of which procedure is used, the time required for dilution of the spent acid-HMX slurry, for the filtering and concentrating of the slurry, and for the washing of the HMX cake until it is free from absorbed acid is substantially reduced and cut to a minimum, in addition to the purity and particle size of the product being increased. When the decantation procedure is used, the purity of the HMX may be increased to about 92% with a slurry temperature as low as 50–55°. It may be that this increase in purity results from the preferential extraction of RDX, which is present as a contaminant, by the spent acid, although we do not wish to be held to this theory.

For a more complete understanding of our invention reference is made to the attached drawing forming a part of the present application.

In the drawing, FIG. 1 is a graphical representation illustrating the solubility of HMX in acetic acid-water mixtures of various concentrations. In the graph the percent acetic acid is plotted against the grams of HMX per hundred ml. of solution.

Figure 2:
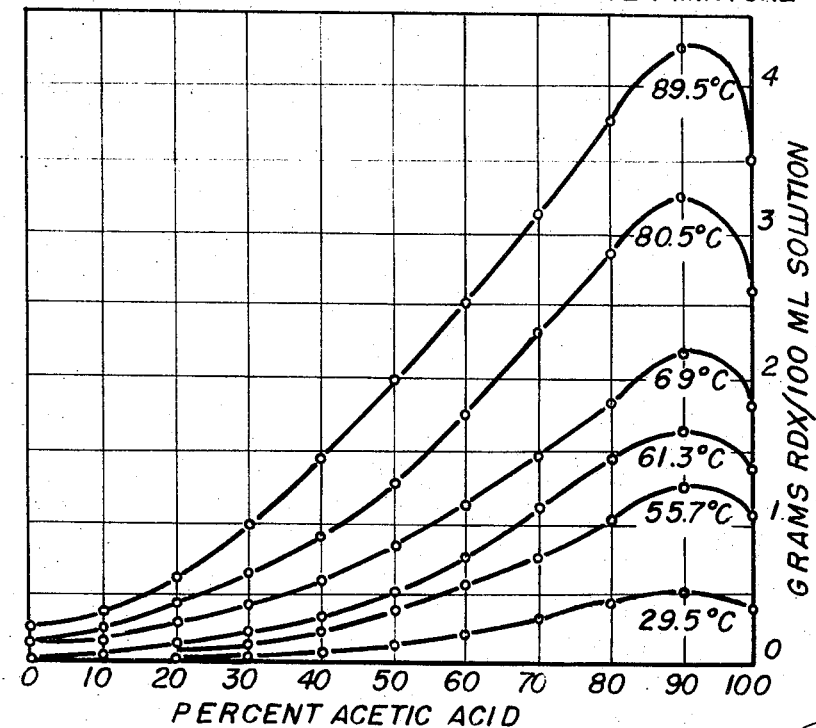

FIG. 2 is a graphical representation showing the solubility of RDX in various mixtures of acetic acid and water. As in FIG. 1 the concentration of the acid is plotted against the solubility in grams per 100 ml. of solution, the grams in this case representing RDX rather than HMX.

A comparison of FIGS. 1 and 2 shows that the product contaminant, RDX, is considerably more soluble in 98% spent acid, our optimum concentration, than HMX, and that accordingly the purity of the HMX and the product isolated by filtration in our increment simmer process is thereby substantially increased and the filtration and purification time correspondingly shortened.

A further understanding of our invention will be had from a consideration of the following examples which are set forth to illustrate certain preferred embodiments.

EXAMPLE I 360 g. of water and 250 ml. anhydrous HMX-acid slurry were added to a still. The slurry was heated to a temperature of 98–100°C. and maintained at this temperature for 30 minutes prior to cooling to 40°C. A second increment of 250 ml. anhydrous slurry was then added and the heat, digestion and cooling cycle repeated a second time and compared with two controls which were run respectively in a one-step simmer process in laboratory equipment and a one-step simmer process in production-size equipment. The results in filtration time per 1,000 ml. simmered product are given in the following table:

| Samples | Filtration time, per 1,000 ml. simmered product | |
|---|---|---|
| Control(one-step simmer in laboratory equipment) | 2 min., | 56 secs. |
| Control (one-step simmer in production equipment) | 3 min. | |
| Increment simmer - laboratory equipment | | 50 secs. |
| Increment simmer - laboratory equipment | | 54 secs. |

In this example the crystal size of $\alpha$-HMX needles was increased from about 1 micron wide by 20–30 microns long to approximately 4 microns wide by 60–80 microns long by increment simmer with the surprising reduction in the filtration time indicated in the preceding chart.

EXAMPLE II 5 ml. water were added to 45 ml. HMX-acid slurry in a 50-ml. graduated cylinder. The slurry was mixed well by inverting the cylinder 5 times. The slurry was then allowed to stand undisturbed for 2 hours, following which the ml. of clear acid solution separated where noted. This procedure was repeated with various concentrations of flocculant being used, the amount and type of flocculant and ml. clear acid separated after 2 hours being indicated in the following table:
Samples from this test:

| Additive | Ml. of Clear Acid Separated After Two Hours |
|---|---|
| None (Control) | 3.5 |
| 0.10% Polyacrylamide (Separan 2610) | 8.0 |
| 0.16% Polyacrylamide (Separan 2610) | 9.0 |
| None (Control) | 3.8 |
| 0.1% Polyacrylamide (Separan 2610) | 13.5 |
| 0.05% Polyacrylamide (Separan 2610) | 11.0 |
| 0.10% Polyacrylamide (Separan 2610), plus 0.01% NaCl | 20.0 |
| 0.10% Polyacrylamide (Separan 2610), plus 0.01% AlK(SO$_4$)$_2$ | 21.0 |

EXAMPLE III

An HMX/acid slurry was pumped at ambient temperature to a mix pot at the rate of approximately 38 g. per min. The flocculant consisting of polyacrylamide (Separan 2610) and aluminum potassium sulfate in an aqueous solution was metered in with the HMX slurry at the rate of 0.09 parts polyacrylamide (Separan 2610) and 0.01 parts aluminum potassium sulfate per 100 parts HMX. Gentle mixing was performed in the mix pot and the treated slurry allowed to overflow to a decant vessel which was operated at a hold-up time of 1½ hours. The acid, containing approximately 0.04% solids, was removed as overflow and the concentrated slurry was removed continuously as underflow.

Data for a typical run were as follows:

| | Without Additives | (based on solid content) 0.09% Polyacrylamide (Separan 2610) plus 0.01% AlK(SO$_4$)$_2$ |
|---|---|---|
| Percent total charge in underflow | 74.5 | 39 |
| Percent total charge in overflow | 25.5 | 61 |
| Percent solids in underflow | 6.9 | 10.3 |
| Percent solids in slurry feed | 5.1 | 4.0 |
| Percent increase in solids content | 1.8 | 6.3 |
| Relative % enrichment of solids in underflow | 135% | 257% |
| Filtration of HMX/acid Slurry: | Decanted | Non-decanted |
| Acid filtration rate, ml./min. | 70.5 | 44.2 |
| Wash water filtration rate, ml./min. | 91.1 | 101.4 |
| Percent solids in slurry | 10.2 | 3.1 |

EXAMPLE IV

Using the procedure described in Example III, the decantation was performed at 50 to 55°C. Although the percent solids in the overflow was increased from approximately 0.04% (at ambient temperatures) to 0.3 to 0.40% (at 50 to 55°C.), the overall efficiency of the process was improved by an increase in throughput and an increase in the solid content of the underflow. The RDX was preferentially extracted by the spent acids and removed in the overflow.

EXAMPLE V

In this example a combination of increment simmer and semi-decantation using a flocculant was used in a pilot-plant scale operation. The procedure used was essentially that described in Example I–IV except that the decantation was substantially continuously. The slurry was concentrated from approximately 5% solids to 11.8%, or 236%, removed as underflow. The overflow contained 0.4% solids. The filtration and wash cycle for the HMX/acid slurry was reduced from approximately 20 hours to approximately 9 hours by using this combination process.

EXAMPLE VI

In this example an increment simmer process similar to that of Example I was followed with the exception that the percent acid concentration in the simmer step was varied to illustrate the importance in the present invention of a high concentration of acid of at least about 98%. The concentration of the acid and the purity of the HMX product in percent HMX are shown in the following table.

The Variation of HMX Purities Simmered in Varying Acid Concentration

| Percent Acid in Simmer Step | Purity of HMX % HMX |
| --- | --- |
| 98 | 99.3 |
| 98 | 99.3 |
| 98 | 99.6 |
| 98 | 99.8 |
| 98 | 99.5 |
| 94 | 92.7 |
| 81 | 87.5 |
| 76 | 88.0 |
| 76 | 89.9 |
| 76 | 87.9 |
| 36 | 85.8 |

From the above description and examples it can readily be seen that we have provided a method of increasing the purity of HMX produced by the nitration of hexamine by simmering or by decanting the crude HMX using a flocculant in an acid concentration of at least about 98% and in increments, thereby reducing the batch volume and the filtration time as well as the amount of reusable spent acid recovered.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for the purification of cyclotetramethylene tetranitramine which comprises heating a portion of crude cyclotetramethylene tetranitramine in the presence of linear nitramines in acetic acid, the acid concentration being at least 98 percent, to a temperature of from about 50 to 98°C., maintaining the resulting slurry for a period of about 15–45 minutes at said temperature from about 50 to 98°C., cooling the slurry to a temperature of about 30 to 40°C., adding to said slurry a new increment of said crude cyclotetramethylene tetranitramine, repeating the same cycle for a series of from 5 to 10 increment additions, and recovering a cyclotetramethylene tetranitramine product of high purity.

2. A process according to claim 1 wherein the cyclotetramethylene tetranitramine product is recovered by filtration.

3. A process according to claim 1 wherein the cyclotetramethylene tetranitramine product is recovered by decantation, overflowing the impurities in the spent acid and collecting the purified cyclotetramethylene tetranitramine in the underflow.

4. A process for purifying cyclotetramethylene tetranitramine produced by the nitration of hexamine comprising heating a cyclotetramethylene tetranitramine-acetic acid slurry of an acid concentration of at least about 98 percent to a temperature of from about 95–98°C., holding the slurry at said temperature for about 30 minutes, cooling the slurry to from about 30 to 40°C., adding an increment of cyclotetramethylene tetranitramine-acetic acid slurry of an acid concentration of about 98 percent to said slurry cooled to a temperature of from about 30 to 40°C., raising the temperature of the slurry to from about 95 to 98°C., cooling the slurry again to said temperature of from about 30 to 40°C., and adding thereto another increment of cyclotetramethylene tetranitramine-acetic acid slurry of an acid concentration of at least about 98 percent repeating the cycle of heating to about 95–98°C. and cooling to from about 30 to 40°C. respectively, adding additional increments of cyclotetramethylene tetranitramine-acetic acid slurry of an acid concentration of about 98 percent to the cooled slurry during each cycle, for a total of 5 – 10 increment additions, thereby substantially increasing the particle size of the cyclotetramethylene tetranitramine, and separating the cyclotetramethylene tetranitramine product.

5. A process according to claim 4 wherein a flocculant is added to the cyclotetramethylene tetranitramine-acetic acid slurry containing about 98 percent of an acid concentration during each increment addition, thereby increasing the settling rate of the cyclotetramethylene tetranitramine and decanting the supernatant liquid upon each increment addition at a slurry temperature of from about 50 – 55°C., thereby removing substantially all of the cyclotetramethylene tetranitramine from the supernatant liquid.

6. A process according to claim 5 wherein the flocculent is selected from a synergistic combination of (1) a polymer selected from the group consisting of high molecular weight, soluble polyoxyethylene, polyacrylonitrile and polyacrylamide and (2) an inorganic salt selected from the group consisting of sodium chloride, aluminum potassium sulfate, barium chloride, ferric nitrate and magnesium sulfate.

7. In a process for the production of crystalline cyclotetramethylene tetranitramine by the nitrolysis of hexamine in an acetic acid medium, aging, dilution of the anhydrous cyclotetramethylene tetranitramine product, the improvement which comprises simmering a slurry of the crude cyclotetramethylene tetranitramine product resulting from the nitrolysis in a series of increments, each consisting of heating at an acid concentration of at least about 98 percent to a temperature of from about 95 to 98°C., cooling from about 30–40°C. and adding a new portion of the slurry of crude cyclotetramethylene tetranitramine product, and recovering a cyclotetramethylene tetranitramine of a purity of at least about 99 percent after the series of increment simmering.

* * * * *